(12) United States Patent
Kopf et al.

(10) Patent No.: US 9,567,497 B2
(45) Date of Patent: Feb. 14, 2017

(54) ADHESIVE AGENT HAVING ADHESIVE BLEND OF ACRYLATE AND STYRENE BLOCK COPOLYMER

(71) Applicant: Lohmann GmbH & Co. KG, Neuwied (DE)

(72) Inventors: Patrik Kopf, Neuwied (DE); Patricia Petrick, Oberbachheim (DE); Axel Kamelgan, Gummersbach (DE)

(73) Assignee: Lohmann GmbH & Co. KG, Neuwied (DE)

( * ) Notice: Subject to any disclaimer, the term of this patent is extended or adjusted under 35 U.S.C. 154(b) by 0 days.

(21) Appl. No.: 14/421,603

(22) PCT Filed: Aug. 13, 2013

(86) PCT No.: PCT/DE2013/000454
§ 371 (c)(1),
(2) Date: Feb. 13, 2015

(87) PCT Pub. No.: WO2014/026668
PCT Pub. Date: Feb. 20, 2014

(65) Prior Publication Data
US 2015/0232713 A1    Aug. 20, 2015

(30) Foreign Application Priority Data
Aug. 16, 2012 (DE) .................. 10 2012 016 186

(51) Int. Cl.
C08L 53/02 (2006.01)
C09J 133/08 (2006.01)
C09J 7/02 (2006.01)

(52) U.S. Cl.
CPC .............. *C09J 133/08* (2013.01); *C08L 53/02* (2013.01); *C09J 7/0217* (2013.01); *C09J 7/0221* (2013.01)

(58) Field of Classification Search
None
See application file for complete search history.

(56) References Cited

U.S. PATENT DOCUMENTS 5,403,658 A * 4/1995 Southwick ............. C09J 153/00
                                                        428/355 AC
6,503,621 B1   1/2003 Ma et al.
2002/0132925 A1* 9/2002 Cernohous ............. C09J 121/00
                                                        525/221

FOREIGN PATENT DOCUMENTS

CN      1433452 A       7/2003
EP      1995288 A1      11/2008
WO      WO 01/59024 A1  8/2001

OTHER PUBLICATIONS

International Search Report for PCT/DE2013/000454 and English translation thereof, mailed on Jan. 14, 2014 (4 pages).

* cited by examiner

*Primary Examiner* — Jeffrey Mullis
(74) *Attorney, Agent, or Firm* — Bookoff McAndrews, PLLC

(57) ABSTRACT

The present invention relates to a carrier-based bonding adhesive agent, which is equipped for bonding adhesion on one or both sides or a carrier-free bonding adhesive agent, in the form of an adhesive strip or stamped part having a bonding adhesive consisting substantially of a blend of polyacrylate and a synthetic rubber as well as one or more adhesive resins. By comparison with previously known adhesive systems such an adhesive exhibits a significant improvement in adhesion on hard, non-polar surfaces such as for example new paint surfaces in the automobile industry.

18 Claims, No Drawings

ADHESIVE AGENT HAVING ADHESIVE BLEND OF ACRYLATE AND STYRENE BLOCK COPOLYMER

This application is the U.S. national phase entry under 35 U.S.C. §371 of International Application No. PCT/DE2013/000454, filed on Aug. 13, 2013, which claims priority to German Patent Application No. DE 10 2012 016 186.7, filed on Aug. 16, 2012.

The present invention relates to a carrier-based adhesive agent, which is equipped for bonding adhesion on one or both sides or a carrier-free bonding adhesive agent in the form of an adhesive strip or stamped part having a bonding adhesive consisting substantially of a blend of polyacrylate and a synthetic rubber and one or more adhesive resins, preferably produced using a solution process. By comparison with previously known systems, such an adhesive agent exhibits a significant improvement in adhesion on hard, non-polar surfaces such as for example new paint surfaces in the automobile industry.

As regards the general properties that characterise bonding adhesives and the known types of bonding adhesives and the components usually used in them, reference is made to the relevant works from literature, which are also mentioned for example in EP 1263913 B1 discussed in more detail below.

Ever increasing requirements in terms of e.g. scratch resistance, shine and resistance to heat and solvents are placed on paints, which are nowadays preferred for painting surfaces, especially in the automobile industry, and the paints themselves must be solvent-free to comply with environmental requirements. Particularly in view of the last point, greater use is being made of new manufacturing processes such as powder coating, which does not use solvents, and even of nanoparticle technology. In addition to this, attempts are currently being made to produce self-healing paint surfaces, i.e. surfaces that automatically repair scratches e.g. when exposed to high temperatures.

As a result of this development, paint topcoats in particular are now harder i.e. strongly cross-linked systems—often with polysiloxane and other additives—are used and these have a much lower surface energy than previous paint surfaces.

Blends of polyacrylates and rubber with the addition of resins are known from patent literature. In many cases these are hot melt or structural adhesive compounds and the identified bonding adhesive compounds are predominantly adhesive compounds with different formulations, production methods and properties from the adhesive compound according to the invention: The excellent properties of the adhesive agent according to the invention due to the blending of essentially incompatible components has not previously been described. For example, the extruder process has so far been the preferred method of production, since blends can be produced relatively simply in this way, as it allows polymers, which would not mix in other manufacturing processes, to mix together to form an homogenous mass.

Thus, EP 1263913 B1 describes a polyacrylate and a thermoplastic, elastomer-based adhesive component comprising a star-shaped asymmetric styrene block copolymer and a resin. These two adhesive components are mixed in a ratio of 70:30 using the extruder process, crosslinking is effected by electron beam and the resultant adhesive is characterised by good shearing and peeling behaviour, good adhesion at low temperatures and clean stripping under the effect of high temperatures.

WO 2008070386 A1 claims a styrene block copolymer, which can also be star-shaped, mixed in an extruder with 0.1 to less than 10% by weight of an acrylate component, which should produce better adhesion on non-polar surfaces.

EP 0868498 B1 specifies an adhesive compound, characterised in that it consists of a bonding adhesive component and optionally a thermoplastic or elastomer or tackified elastomer or thermoplastic elastomer components, whereby the bonding adhesive cannot be an acrylic material if a thermoplastic elastomeric component is used.

WO 1996025469 A1 treats anisotropic adhesive compounds by blending thermoplastics and other materials into the adhesive compound. This is done by means of an extruder and nozzle coating, because this is the only way to create an "orientation" in the adhesive compound and therefore anisotropy.

WO 2010069800 A1 describes a bonding adhesive compound made from an homogenous mixture of at least one natural rubber component and at least one polyacrylate component, produced in an extruder, crosslinking being effected after shaping of the mixture by means of electron beam hardening.

However, none of these documents describes an adhesive compound and its composition or an adhesive agent produced using this adhesive compound with such high adhesion and cohesion on new paint surfaces and such high thermal resistance as those which characterise the adhesive compound according to the invention and the adhesive agent produced from it. The present blend combines the good adhesion on normally difficult-to-bond substrates for which synthetic rubbers are generally known, with the high cohesion and heat resistance for which polyacrylate bonding adhesive compounds are generally known. At the same time, the blends according to the invention are more than just a combination of the constituent adhesive compounds since, as the following examples show, the rubber adhesive compound they contain adheres poorly, if at all, and, although the acrylate adhesive compound they contain is cohesive and heat-resistant, it does not adhere well to paint. However, the blends adhere surprisingly well and moreover have high thermal resistance, which is not obvious to a person skilled in the art from the components used.

Essentially rubbers for adhesive compounds can be divided into natural rubbers and synthetic rubbers.

According to DIN 53501, non-crosslinked but crosslinkable polymers with rubber elastic properties at room temperature are defined as rubbers. Natural rubber consists of monomeric isoprene (2-methyl-1,3-butadiene, $C_5H_8$) that is polymerised in an extremely uniform structure to form terpene cis-1,4-polyisoprene. It is categorised as a polyterpene. Natural rubber is longer-chained than all synthetic rubbers, is not fusible and is only crosslinkable with the addition of additives and therefore less suitable for the present purpose.

Synthetic rubbers are macromolecular substances of synthetic origin. They have shorter chains and so are fusible or even liquid and therefore more suitable for producing the adhesive compound according to the invention. In principle, all types of synthetic rubber can be used to produce the present adhesive compound, i.e. styrene-butadiene-rubber (SBR), polybutadiene (BR), isoprene rubber (IR), nitrile-butadiene rubber (NBR), chloroprene rubber (CR) or butyl rubber (IIR), to name the principal ones. These types have a linear, branched or star-shaped topology. Linear styrene block copolymers (SBC), i.e. synthetic polymers of two "hard" styrene end blocks and isoprene (SIS) or butadiene (SBS) or even mixtures such as ethylene-butylene (SEBS) as "soft" middle blocks are used in particular. SBCs are very suitable components in adhesives, because the S blocks of different molecules combine at low temperature to form a phase. This rubber therefore holds together well at room temperature, it is very cohesive. At higher temperatures above c. 80° C., the S blocks split away from each other, the rubber starts to melt and cohesion fails. For this reason, SBCs are the preferred rubbers in hot melt adhesives.

Polyacrylates are polymeric esters of acrylic acid and of acrylic acid derivatives with alcohols. They are the basis of many adhesive compounds. For the purposes of this invention, any compound that consists of a polymer with a basic structure of acrylate monomers is defined as a polyacrylate component.

The group of these monomers consists of all compounds with a structure that can be derived from the structure of unsubstituted or substituted acrylic acid or methacrylic acid but also of esters of these compounds, which can be described by the general formula $CH2=C(R1)(COOR2)$, wherein R1 can be a hydrogen atom or a methyl group, R2 can be a hydrogen atom or be selected from amongst the group of saturated, un-branched or branched, substituted or un-substituted C1 to C30 alkyl groups.

Suitable monomeric building blocks are described in the "Acrylic Adhesives" chapter in: Donatas Satas, "Handbook of Pressure Sensitive Adhesive Technology", Second Edition, edited by Donatas Satas, Van Nostrand Reinhold New York, pages 396-456. Thus acrylic and methacrylic esters can be used as acrylate-like monomers, where the residue R2 is selected from the group of saturated, un-branched or branched, substituted or un-substituted C4 to C14 alkyl groups, in particular C4 to C9 alkyl groups. Although this list is not exhaustive, specific examples are methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and their branched isomers, for example isobutyl acrylate, 2-ethylhexyl acrylate, 2-ethylhexyl methacrylate, isooctyl acrylate, isooctyl methacrylate as well as cyclohexyl methacrylate, isobornyl acrylate, isobornyl methacrylate and 3,5-dimethyl adamantyl acrylate.

The polyacrylate components can additionally contain further monomer units with functional groups. These functional groups can control glass transition temperature, adhesive tendency and crosslinkability for example. Vinyl compounds containing such functional groups are acrylic acid, methacrylic acid, maleic anhydride, styrene, styrene compounds, vinyl acetate, (meth)acrylamide, n-substituted (meth)acrylamide, β-acryloyloxy propionic acid, vinyl acetic acid, fumaric acid, crotonic acid, aconitic acid, dimethyl acrylic acid, trichloro acrylic acid, itaconic acid, vinyl acetate, hydroxyalkyl (meth)acrylate, (meth)acrylate containing amino groups, (meth)acrylate containing hydroxyl groups, particularly preferably 2-hydroxyethyl (meth)acrylate, 2-hydroxypropyl (meth)acrylate and/or 4-hydroxybutyl (meth)acrylate, to name some (but not all) examples.

Polyacrylate components normally contain 0-10% by weight of these additional monomer units, either an additional monomer unit being used on its own or mixtures of the same.

The properties of the polyacrylate components are predominantly determined by the choice of monomers, the achieved molecular weight and type and quantity of crosslinker chosen. Suitable monomer building blocks and crosslinking reagents are described in the above-mentioned "Acrylic Adhesives" chapter in: Donatas Satas, "Handbook of Pressure Sensitive Adhesive Technology", Second Edition, edited by Donatas Satas, Van Nostrand Reinhold New York, pages 396-456.

The glass transition temperature achieved depends upon the monomers used. In the dry state, the polyacrylate components used for the adhesive compounds according to the invention have glass transition temperatures in particular between −80° C. and +25° C., preferably between −50° C. and +10° C. and particularly preferably between −40° C. and 0° C.

It is especially advantageous for the polyacrylate components if the composition of the corresponding monomers is selected such that the resultant adhesive compounds possess adhesive properties as defined by D. Satas, "Handbook of Pressure Sensitive Adhesive Technology", 1989, published by VAN NOSTRAND REINHOLD, New York. For this, the glass transition temperature of the polyacrylate component should be below 25° C. for example and the Dahlquist criterion must be satisfied.

The polyacrylate components used for the invention are preferably produced by radical initiated polymerisation. Free radical polymerisation can be performed in the presence of an organic solvent or in the presence of water or in mixtures of organic solvents and water or in substance. Preferably as little solvent as possible is used. Usually polymerisation is effected in a nitrogen atmosphere. Depending upon volume and temperature, polymerisation takes between six and 48 hours.

The preferred solvents used in solution polymerisation are esters of saturated carbonic acids (such as ethyl acetate), aliphatic hydrocarbons (such as n-hexane or n-heptane), ketones (such as acetone or methyl ethyl ketone), petrol ether or mixtures of these solvents. To perform polymerisation in aqueous media or mixtures of organic and aqueous solvents, the emulsifiers and stabilisers known to a person skilled in the art are added. Standard radical forming compounds such as for example peroxides, azo compounds or peroxosulphates are used as polymerisation initiators. Initiator mixtures can also be used. Additional regulators to lower molecular weight and reduce polydispersity can be added during polymerisation. Alcohols and esters for example can be used as so-called polymerisation regulators. The average molecular weight Mw of acrylate bonding adhesive compounds is advantageously between 200,000 and 2,000,000 g/mol, more preferably between 400,000 and 1,000,000 g/mol.

The solvents that are advantageous for the invention are more likely or predominantly non-polar. A solvent or solvent mixture in which both the polyacrylate components and the rubber components are soluble should be chosen. Petrol, toluene or n-hexane for example are advantageous. Admixtures of polar solvents such as acetone or isopropanol for example can improve the solubility and therefore intermixing of the components.

In accordance with the invention, for solution polymerisation the solids content of the polyacrylate components is notably between 30 and 70% by weight, preferably between 45 and 60% by weight.

In order to improve the properties of polyacrylates as bonding adhesives, they are usually crosslinked after coating. Possible crosslinking mechanisms are chemical crosslinking (e.g. covalent bonds) or physical crosslinking (domain formation). This crosslinking can be initiated by thermal influences, e.g. during drying of the adhesive compound containing solvent or by radiation influences (UV light, electron radiation). Some (non-exhaustive) examples of crosslinking reagents are multifunctional aziridines (trade name e.g. Trazidine VN, Crosslinker CX-100), multifunctional isocyanates, multifunctional acrylates (trade name e.g. Laromer TMPTA), metal chelates (e.g. organic titanium compounds, aluminium acetylacetonate), metallic salts (e.g. zinc salts), multifunctional peroxides and organic peroxides. Usually these crosslinking reagents react with functional groups or multiple or single bonds in the polymer components of the adhesive compound. In the present invention, crosslinking can take place within the polyacrylates but also within other components of the adhesive compound such as the styrene block copolymers or the adhesive resins. Crosslinking can also take place between the polyacrylates and the other components of the adhesive compound. Suitable crosslinking can improve for example peeling and shearing strength, temperature and solvent resistance and removability of the adhesive compound.

An additional component of the adhesive compound according to the invention is at least one adhesive resin. Adhesive resins are tackifying substances that can help to formulate adhesives from suitable backbone polymers, i.e. the adhesive resins lend the backbone polymers adhesive, wetting and tackifying properties for example. A general overview of adhesive resins can be found in the "Tackifier Resins" chapter, Donatas Satas, "Handbook of Pressure Sensitive Adhesive Technology", Second Edition, edited by Donatas Satas, Van Nostrand Reinhold New York, pages 527-544.

Adhesive resins can essentially be divided into synthetic (e.g. hydrocarbon resins), semi-synthetic (e.g. terpene phenolic resins) and natural resins and their derivatives (colophonium derivatives). Hydrocarbon resins can be divided into aliphatic hydrocarbon resins (usually synthesised from the C5 stream of crude oil processing), aromatic hydrocarbon resins (from the C9 stream of crude oil processing or from coal tar) and mixed resins from C5 and C9 components. Additional monomers, such as phenolic components for example, can be admixed during manufacture (polymerisation). Furthermore, hydrocarbon resins can be fully or partially hydrogenated.

The present invention uses at least one adhesive resin, whereby at least one of the possibly multiple adhesive resins comes from the group of aromatic hydrocarbon resins. A phenol-modified aromatic hydrocarbon resin is especially preferred. A second adhesive resin is preferred, a terpene phenolic resin being especially preferred.

A disadvantage of using SBC adhesive compounds is their poor long-term stability: the unsaturated polymer is prone to oxidative reactions and so unsaturated compounds need an antioxidant. The long-term stability of these systems is therefore provided by antioxidant additives. As regards antioxidants, an essential distinction can be made between primary and secondary antioxidants. Primary antioxidants act by breaking chains in the chain propagation step, while secondary or preventive antioxidants destroy hydrogen peroxide groups, which trigger chain initiation or branching. The anti-ageing agents (antioxidant agents, antioxidants) are organic chemicals that are added to a compound to protect it from degrading, oxidative breakdown, premature ageing or auto-oxidation. Such additives are used in almost all sectors of the chemical and pharmaceutical industry to increase the shelf-life of chemicals or products produced from them, natural materials, synthetic materials, foodstuffs and other consumables, pharmaceuticals and cosmetics. An overview of common antioxidants that can also be used in the present context can be found for example in Ullmanns Encyklopädie der Technischen Chemie, 4th edition, volume 8, pages 25-42 (1974).

In the present case, very good stabilisation of the bonding adhesive compound at higher temperatures was achieved with antioxidants from the cresol group, in particular 4,6-bis(alkylthioalkyl)-o-cresols, preferably Irganox® 1726, Irganox® 1010 or Irganox® 1520 but also other phenol-based antioxidants like Vulkanox® BFK or even other common antioxidants like DOP (dioctylphthalate) can be used for this purpose.

Moreover, depending upon the desired effect, for example for colouration or as a defoaming agent, additives such as fillers, plasticisers, processing aids, activators, pigments, accelerators or retarders etc. normally used in the manufacture of bonding adhesives can be used. In particular, for blends of elastomers and polyacrylates, solubilisers can be added to make the otherwise incompatible phases permanently compatible both before coating and also in the subsequent adhesive layer. Examples of this can be found in the article "High Performance Plastic Additives based on Controlled Architecture Material (CAM) Technology", Cemohous et al., 2003 PLACE Conference & GLOBAL HOT MELT Symposium.

An adhesive manufactured with the adhesive compound according to the invention can be a carrier-based adhesive strip, equipped for bonding adhesion on one or both sides, or a carrier-free bonding adhesive strip or even a stamped part.

In the case of carrier-based adhesive agents, the carrier can be selected from any of the known adhesive strip carrier materials, so for example from paper, foil, metallised foils, foam, fabric, viscoelastic materials and combinations of said materials. Particularly suitable carrier materials are PE, PP, PB, PIB, PU, PVC, EVA, EPDM, polystyrene or polyacrylate foams.

Papers, plastic or textile-based materials commonly used for such purposes can be used to cover and protect the adhesive agent before use, if necessary coated with a substance such as e.g. polyvinyl alcohol or silicones to aid removal from the bond surface.

The first step in producing the adhesive compound is to mix together the polyacrylate components and the synthetic rubber components. In a solution process this can be done using an extruder for example. In the preferred solution process the dissolved components are intermixed by means of an agitator. Paddle mixers, jet stream mixers, dissolvers or static mixers can be used for example. Thorough blending is guaranteed when the resulting dispersion is opaque but quasi-homogenous. This can be visualised for example if a dried film of the adhesive compound displays phase structures with individual phase diameters of less than 40 μm.

The adhesive agent can be made by one of the well known production methods, for example blade or roller coating or even nozzle application.

The following test methods were used to validate the production examples given below:

90° Peel Strength

90° peel strength is measured as per DIN ISO 1939 under standard atmospheric conditions (23° C., 50% relative humidity). The substrate is wiped down with a petrol-soaked cloth and left to evaporate. A 25 mm wide test strip is applied to the substrate. A roller (5 kg in weight) is then rolled over the test strip twice (5 m/min). The test sample is conditioned under standard atmospheric conditions (23° C., 50% relative humidity) for 24 hours and then the force required to separate the adhesive strip from the substrate, applied at an angle of separation of 90% and a velocity of 50 mm/min, is measured. In the case of an adhesive strip with foam carrier, adhesion of the adhesive compound to the substrate can be so great that it exceeds the internal strength of the foam carrier. This results in foam split failure (abbreviated to FSF). This means that the peel strength of the foam carriers used in the examples is greater than 35 N/cm. Other fracture patterns are cohesion fracture (CF) and normal fracture with residues on the substrate (RS).

90° Peel Strength after Thermal Ageing

After 24 hours of conditioning under standard atmospheric conditions, the test specimen as described above is exposed to additional ageing in a circulating air oven at 90° C. for 10 days. After reconditioning under standard atmospheric conditions (24 hours) the 90° peel strength is measured as described above.

90° Peel Strength after Humid Thermal Ageing

After 24 hours of conditioning under standard atmospheric conditions, the test specimen as described above is exposed to additional ageing at 70° C. and saturated humidity (100% relative humidity) for 10 days. After reconditioning at standard atmospheric conditions (24 hours) the 90° peel strength is measured as described above.

Ascending Thermal Test

The test strip (25 mm wide) consists of the adhesive compound layer, laminated on a polyester foil (50 μm thickness). The test strip is bonded to a stainless steel plate (previously cleaned with petrol) overlapping to cover a 25 mm×25 mm area. A roller (5 kg in weight) is then rolled over the test strip twice (5 m/min). The test strip is vertically loaded with 1 kg (shearing load) and this arrangement is suspended in a circulating air oven. A temperature program varies the temperature from 30° C. to 150° C. in increments of 10 Kelvin, the temperature being increased by 10 Kelvin every 30 minutes. The test result is the maximum temperature at which the arrangement is still held, that is to say the adhesive strip has not sheared off.

Solids Content

The solids content is the non-volatile fraction of a polymer solution. The solution is weighed, the volatile components are vaporised at 105° C. in the circulating air cupboard for 60 min and the solution is then reweighed.

Substrates:

Stainless steel plate: Stainless steel as per Afera standard 4001

Painted plate 1: Sheet steel with a 3-layer paint coat: Filler, base coat and, as a clear coat: 2-component clear coat Supermar from DuPont, drying conditions: 20 min at 140° C.

Painted plate 2: Sheet steel with a 3-layer paint coat: Filler, base coat and, as a clear coat: 2-component clear coat EverGloss from BASF, drying conditions: 20 min at 140° C.

Materials:

Note: In each case "parts" refer to parts by weight.

Polymer 1: Thermally polymerised solvent-based copolymer of 50 parts n-butyl acrylate, 43.9 parts 2-ethylhexyl acrylate, 3.5 parts acrylic acid and 2.5 parts hydroxyethyl acrylate. Solvent: petrol ether 60/95 and acetone in 85:15 weight ratio. Nitrogen atmosphere. Initiator 0.64 parts azoisobuturonitrile (AIBN) from DuPont. Solids content c. 55%. Average molecular weight Mw (gel-permeation chromatography, standard polystyrene): Mw=660,000 g/mol, polydispersity D (Mw/Mn)=3.5

Polymer 2: UV-polymerised solvent-based copolymer of 75 parts 2-ethylhexyl acrylate, 20 parts isobornyl acrylate and 5 parts acrylic acid. Solvent: petrol ether 60/95, UV initiator: 0.35 parts Irgacure 1800 from BASF, UV radiation with doped medium pressure lamp for c. 40 min in nitrogen atmosphere. Solids content c. 55%. Average molecular weight Mw=310,000 g/mol, polydispersity D=4.6

Polymer 3: Kraton D 1161-PT from Kraton Polymers. This is a linear styrene-isoprene-styrene block copolymer (SIS) with a styrene fraction of 15%.

Resin 1: Dertophene T 105 from DRT. A terpene phenolic resin with a softening point (ring and ball) of c. 105° C.

Resin 2: Novares TA 100 from Rutgers Novares GmbH—a phenol-modified, petro-aromatic hydrocarbon resin. Copolymerisate of unsaturated, aromatic C9/C10 hydrocarbons with phenol.

Resin 3: Novares TN 100 from Rutgers Novares GmbH—a petro-aromatic hydrocarbon resin. Copolymerisate of unsaturated, aromatic C9/C10 hydrocarbons.

AO1: Antioxidant Irganox 1726 from BASF.

SLV1: Mixture of petrol ether 60/95 and acetone in 85:15 weight ratio.

CL1: Crosslinker solution consisting of 2.5 parts Trazidin VN from Tramaco and 97.5 parts acetone.

Foam Carrier F1: Black polyolefin foam from Sekisui Alveo AG, thickness 650 μm, absolute density 185 kg/m$^3$. The foam carrier is pretreated with corona radiation before lamination to improve adhesion.

EXAMPLES

Example 1 (E1)

10.7 parts Polymer 3, 21.2 parts Resin 2 and 0.32 parts A01 are dissolved in solvent SLV1 to give a solids content of c. 55%. A solution of 65.1 parts Polymer 1, 19.9 parts Resin 1 and 16.3 parts SLV1 are added to the mixture.

The entire mixture is blended in a laboratory dissolver (Dispermat TU from VMA-Getzmann, with dissolver disc) for c. 3 minutes at c. 5000 rpm to produce a quasi-homogenous dispersion. This mixture is further processed within 12 hours. 4.58 parts of crosslinker solution CL1 are homogenously blended into this mixture. The adhesive compound is spread using a siliconised polyester foil (thickness 50 μm) and then dried firstly at room temperature for 10 minutes and then at 110° C. in the circulating air oven for 5 min. The application thickness is chosen to give a coating of c. 90 g/m$^2$ after drying. This adhesive layer then consists of 41% by weight polyacrylate, 12% by weight SBC and 47% by weight adhesive resins. This adhesive film is laminated onto one side of the corona-treated foam carrier F1 at room temperature. To stabilise the sample for the test methods, the back of the foam carrier is reinforced with an adhesive polyester foil (thickness 50 μm). For the purpose of measurement in the ascending thermal test only, the adhesive film is not laminated to F1 but to a corona-treated polyester foil (thickness 50 μm). This produces a temperature-resistant carrier for this test so that the result is determined solely by the adhesive compound and not by the carrier material.

Example 2 (E2)

As Example 1, but Polymer 2 is used instead of Polymer 1.

Example 3 (E3, Comparative Example)

Pure polyacrylate bonding adhesive: 100 parts Polymer 1 are mixed with 7 parts CL1 and applied as described above, dried and laminated to the foam carrier.

Example 4 (E4, Comparative Example)

Pure polyacrylate bonding adhesive: 100 parts Polymer 2 are mixed with 7 parts CL1 and applied as described above, dried and laminated to the foam carrier.

Example 5 (E5, Comparative Example)

Polyacrylate bonding adhesive with terpene phenolic resin: 65.1 parts Polymer 1 are mixed with 19.9 parts Resin 1 and 16.3 parts SLV1. 4.58 parts CL1 and mixed in as a crosslinker solution and applied as described above, dried and laminated to the foam carrier.

Example 6 (E6, Comparative Example)

Polyacrylate bonding adhesive with terpene phenolic resin and aromatic hydrocarbon resin: 65.1 parts Polymer 1 are mixed with 19.9 parts Resin 1, 21.2 parts Resin 2 and 16.3 parts SLV1. 4.58 parts CL1 and mixed in as crosslinker solution and applied as described above, dried and laminated to the foam carrier.

Example 7 (E7, Comparative Example)

Styrene block copolymer with tackifier resin: 10.7 parts Polymer 3, 21.2 parts Resin 2 and 0.32 parts A01 are dissolved in solvent SLV1 to give a solids content of c. 55%. The mixture is applied as described above, dried and laminated to the foam carrier.

Example 8 (E8, Comparative Example)

Blend of polyacrylate and styrene block copolymer, without aromatic hydrocarbon resin. As Example 1 but without Resin 2. Application, drying and laminating as described above.

Example 9 (E9)

As Example 1, but Resin 3 is used instead of Resin 2.

Example 10 (E10)

As Example 1, but only 3.6 parts of Polymer 3 are used. The adhesive layer then consists of 45% by weight polyacrylate, 4% by weight SBC and 51% by weight adhesive resins.

Example 11 (E11)

As Example 1, but only 21.4 parts of Polymer 3 are used. The adhesive layer then consists of 36% by weight polyacrylate, 22% by weight SBC and 42% by weight adhesive resins.

TABLE

|  | Substrate | 90° peel strength at 23° C. N/cm | 90° peel strength after thermal ageing N/cm | 90° peel strength after humid thermal ageing N/cm | Ascending thermal test, Substrate: stainless steel plate ° C. |
|---|---|---|---|---|---|
| E1 | Paint 1 | FSF (>35) | 35 (RS) | FSF (>35) | 120 |
| E1 | Paint 2 | FSF (>35) | FSF (>35) | FSF (>35) |  |
| E2 | Paint 1 | FSF (>35) | 32 (RS) | FSF (>35) | 110 |
| E3 | Paint 1 | 10 | 15 (CF) | 18 (CF) | 150 |
| E4 | Paint 1 | 8 | 11 (CF) | 11 (CF)– | 150 |
| E5 | Paint 1 | 11 | 5 | 25 (CF) | 150 |
| E6 | Paint 1 | FSF (>35) | FSF (>35) | FSF (>35) | 70 |
| E7 | Paint 1 | n.m. | n.m. | n.m. | n.m. |
| E8 | Paint 1 | 8 | 6 | 9 | 150 |
| E9 | Paint 1 | FSF (>35) | 14 | 16 (CF) | 150 |
| E10 | Paint 1 | FSF (>35) | FSF (>35) | FSF (>35) | 110 |
| E11 | Paint 1 | FSF (>35) | 28 (RS) | 25 (RS) | 120 |

FSF (>35): adhesion is so great that the carrier foam splits. This only starts to split above c. 35 N/cm, i.e. the adhesion coefficient is greater than 35 N/cm; n.m.: not measurable, adhesive compound is not adhesive; RS: normal fracture but slight residues of adhesive on the substrate; CF: cohesive fracture, adhesive compound splits, often peeling in strands.

The invention claimed is:

1. A bonding adhesive agent for bonding to non-polar surfaces, the bonding adhesive agent comprising a polyacrylate and vinyl aromatic block copolymer-based adhesive compound, wherein the adhesive compound comprises a mixture of:
    a) 20%-60% by weight of at least one polyacrylate copolymer;
    b) 2%-40% by weight of at least one linear vinyl aromatic block copolymer;
    c) 20%-60% by weight of a combination of a first adhesive resin and a second adhesive resin, wherein the first adhesive resin is a phenol-modified aromatic hydrocarbon resin and the second adhesive resin is a terpene phenolic resin; and
    d) 0.05%-3% by weight of a crosslinker, relative to the weight of the at least one polyacrylate copolymer.

2. The bonding adhesive agent according to claim 1, wherein the linear vinyl aromatic block copolymer comprises an elastomer.

3. The bonding adhesive agent according to claim 1, wherein the crosslinker is selected from the group consisting of multifunctional aziridines, isocyanates, acrylates, epoxides, organic peroxides, metal chelates, or metallic salts.

4. The bonding adhesive agent according to claim 1, wherein the adhesive compound is produced in solvent.

5. The bonding adhesive agent according to claim 1, wherein the adhesive compound is produced using a solvent-free process.

6. The bonding adhesive agent according to claim 1, wherein the bonding adhesive agent is a carrier-based adhesive strip or stamped part, equipped for bonding adhesion on one or both sides, or a carrier-free transfer strip.

7. The bonding adhesive agent according to claim 6, wherein the bonding adhesive agent is a carrier-based adhesive strip or stamped part, equipped for bonding adhesion on both sides, comprising a foam carrier.

8. The bonding adhesive agent according to claim 2, wherein the linear vinyl aromatic block copolymer comprises a styrene block copolymer.

9. The bonding adhesive agent according to claim 2, wherein the linear vinyl aromatic block copolymer comprises a styrene isoprene block copolymer, a styrene-butadiene block copolymer, a combination thereof, or a hydrogenation product thereof.

10. The bonding adhesive agent according to claim 1, further comprising a carrier chosen from paper, foil, metallised foil, foam, viscoelastic materials, or any combination thereof.

11. A bonding adhesive agent comprising an adhesive compound, wherein the adhesive compound comprises a mixture of:
   a) 20%-60% by weight of at least one polyacrylate copolymer;
   b) 2%-40% by weight of at least one styrene block copolymer or hydrogenation product thereof;
   c) 20%-60% by weight of a combination of a first aromatic hydrocarbon resin and a second aromatic hydrocarbon resin, wherein the first aromatic hydrocarbon resin is a phenol-modified aromatic hydrocarbon resin and the second aromatic hydrocarbon resin is a terpene phenolic resin; and
   d) 0.05%-3% by weight of a crosslinker, relative to the weight of the at least one polyacrylate copolymer.

12. The bonding adhesive agent according to claim 11, further comprising a carrier chosen from paper, foil, metallised foil, foam, viscoelastic materials, or any combination thereof.

13. The bonding adhesive agent according to claim 12, wherein the bonding adhesive agent is an adhesive strip or stamped part, equipped for bonding adhesion on both sides.

14. A method of preparing a bonding adhesive agent for bonding to non-polar surfaces, wherein the bonding adhesive agent comprises a polyacrylate and vinyl aromatic block copolymer-based adhesive compound, the method comprising producing the adhesive compound by mixing:
   a) 20%-60% by weight of at least one polyacrylate copolymer;
   b) 2%-40% by weight of at least one linear vinyl aromatic block copolymer;
   c) 20%-60% by weight of a combination of a first adhesive resin and a second adhesive resin, wherein the first adhesive resin is a phenol-modified aromatic hydrocarbon resin and the second adhesive resin is a terpene phenolic resin; and
   d) 0.05%-3% by weight of a crosslinker, relative to the weight of the at least one polyacrylate copolymer.

15. The method according to claim 14, wherein the adhesive compound is produced in solvent.

16. The method according to claim 14, wherein the adhesive compound is produced using a solvent-free process.

17. The method according to claim 14, wherein the bonding adhesive agent is in the form of an adhesive strip.

18. The method according to claim 14, further comprising combining the adhesive compound with a carrier to form an adhesive strip or stamped part, equipped for bonding adhesion on both sides.

* * * * *

UNITED STATES PATENT AND TRADEMARK OFFICE
CERTIFICATE OF CORRECTION

PATENT NO.         : 9,567,497 B2                                              Page 1 of 1
APPLICATION NO.    : 14/421603
DATED              : February 14, 2017
INVENTOR(S)        : Patrik Kopf et al.

It is certified that error appears in the above-identified patent and that said Letters Patent is hereby corrected as shown below:

On the Title Page

In item (30) Foreign Application Priority Data, the German Application No. should read
-- 10 2012 016 186.7 --.

Signed and Sealed this
Second Day of May, 2017

Michelle K. Lee
*Director of the United States Patent and Trademark Office*